June 21, 1955     S. RUBEN     2,711,497
ALTERNATING CURRENT RECTIFIER AND METHOD OF MAKING THE SAME Filed Oct. 6, 1953

INVENTOR
Samuel Ruben
BY
ATTORNEY

United States Patent Office 2,711,497
Patented June 21, 1955

2,711,497

ALTERNATING CURRENT RECTIFIER AND METHOD OF MAKING THE SAME

Samuel Ruben, New Rochelle, N. Y.

Application October 6, 1953, Serial No. 384,495

15 Claims. (Cl. 317—238)

This invention relates to asymmetrically conductive devices suitable for use as alternating current rectifiers, specifically to a plate junction type rectifier employing an electrode of lead peroxide, and to a method of producing such rectifiers.

The present application is a continuation in part of my co-pending application Serial No. 383,185, filed September 30, 1953, entitled "Lead Peroxide Rectifiers and Method of Making the Same."

In my aforesaid application, I have disclosed a rectifier comprising an electrode of lead peroxide in integral contact with anodized titanium. It is the general object of the present invention to improve alternating current rectifiers of the described character.

It is another object of the present invention to provide a dry rectifier capable of operation over a very wide range of ambient temperatures and particularly suitable for being operated at relatively high temperatures.

The invention also contemplates a junction rectifier characterized by a high degree of uniformity between junctions and capable of being manufactured on a practical and industrial scale at a low cost.

Other and further objects and advantages of the present invention will become apparent from the following description, taken in conjunction with the accompanying drawing, in which.

Figure 1:
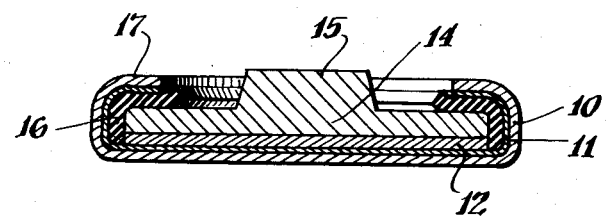
Fig. 1 is a vertical sectional view of a sealed rectifier junction embodying the invention.

Broadly stated, I have found that if titanium is anodized in a suitable electrolyte, an integral titanium oxide layer of micron thickness is produced thereon. This anodized layer is of high electrical conductivity. If a body of electrolytically produced lead peroxide particles is compressed on the surface of the anodized titanium, a rectifier junction of excellent electrical characteristics is obtained.

In manufacturing my novel rectifier junctions, the first step is the provision of an anodized or electrolytically oxidized layer on a base or plate of titanium. This may be accomplished by any of the methods disclosed in my above-mentioned co-pending application, such as by making a titanium plate the anode in a solution of potassium hydroxide and passing a current between said anode and a graphite cathode.

The preparation of a lead peroxide powder suitable for the production of a rectifier is an important part of the present invention. The production of the lead peroxide powder is accomplished by providing a metal anode in an electrolyte composed of a suitable lead salt and passing current between such anode and a graphite cathode. The electrolyte may be any one of those disclosed in my co-pending application. Thus, good results are obtained by using an electrolyte composed of an aqueous solution of lead acetate or of a mixture of lead acetate with a more conductive acetate, such as potassium acetate. While the anode may be formed from any inert, electrically conductive metal or material, particularly good results are obtained by using an electrolytically oxidized, flexible titanium sheet for the anode.

In carrying out the method of the invention, current is caused to flow between the anodized titanium sheet and the cathode, the applied voltage being in the order of approximately 13 volts. Under these conditions a deposit of lead peroxide will be formed on the anode, the amount of the deposit being approximately 4 grams of lead peroxide per ampere hour. The lead peroxide deposit may be readily removed from the anode plate, for example, by slightly flexing such plate, whereby the relatively rigid deposit will fall off. This material is then comminuted in a ball mill, where it is ground until the particles will pass through a sieve of 100 mesh. This powder may then be compressed at a pressure of one ton per square inch on an anodized titanium sheet and will form therewith a highly efficient rectifier junction. The thickness of the lead peroxide layer is not critical and may be between 0.010" and 0.030".

It has been found that the electrolytically produced lead peroxide provides very important advantages over lead peroxide that has been produced chemically. More particularly, the resistivity of this powder, $1 \times 10^{-4}$ ohm/cm., is a mere fraction of that of chemically produced lead peroxide, which is $142 \times 10^{-4}$ ohm/cm., these figures being based on employing a pressure of 10 tons per square inch for compressing the powders. This is probably due to the structure of the electrolytically produced lead peroxide, which is believed to contain oxygen in less than stoichiometric proportions with an excess of lead, such as $PbO_{1.991}$, providing a source of free electrons and accounting for the excellent electronic conductivity with metal-like conduction characteristics. Furthermore, the electrolytically produced lead peroxide avoids a serious disadvantage of chemically produced lead peroxide, which tends to electro-chemically react with a titanium oxide surface, with evidence of reduction of the electrically conductive lead peroxide to the non-conductive lead oxide. This is especially true when the rectifier is operated at higher temperatures or high current density, under which conditions the chemically produced lead peroxide would materially reduce the useful life of the rectifier.

Referring now more particularly to the drawing, Fig. 1 illustrates a preferred form of the rectifier of the invention. Reference numeral 10 denotes a shell or cup formed of titanium, having an anodized or electrolytically oxidized layer 11 at least on the inner surface thereof. In view of the good conductivity of the said layer, it is possible to anodize both the inner and outer surfaces of the shell, which simplifies carrying out the anodizing process. A body of electrolytically produced lead peroxide particles is compressed in the bottom of shell 10, forming thereon a coherent, conductive layer 12.

Figure 2:
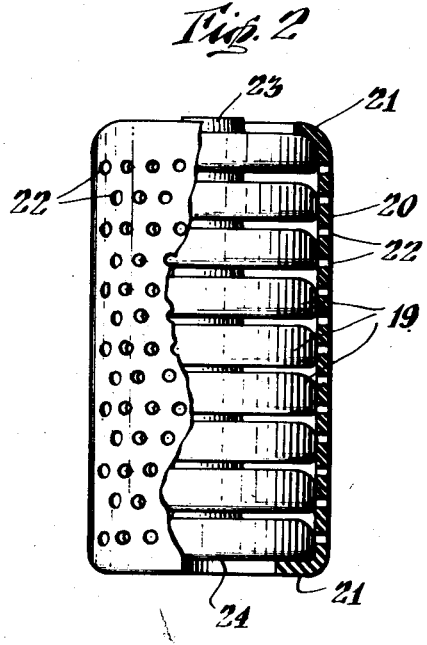
Fig. 2 is a side elevational view, having parts in section, of a high voltage rectifier comprising a stack of rectifier junctions of the type shown in Fig. 1.

Upon the exposed surface of lead peroxide layer 12, there is provided a nickel-plated steel contact plate or terminal 14 having a central boss 15. A grommet 16 of elastic insulating material, such as a synthetic rubber known in the market as neoprene, surrounds the circumferential portions of contact plate 14 to insulate the said plate from the titanium shell 10. After assembly, the marginal end portions of shell 10 are crimped down, as indicated at 17. The crimped down portions of shell 10 will maintain grommet 16 under strong compression and will also maintain high contact pressure between contact plate 14 and lead peroxide layer 12. At the same time, grommet 16, together with shell 10 and plate 14, constitutes a sealed enclosure for the rectifier junction. The terminals of said junction are constituted by boss 15 of plate 14 and by the lower surface of titanium shell 10. A rectifier junction of the described character is capable of handling an alternating current voltage of about 17 volts.

Where it is desired to rectify a voltage higher than can be safely handled by a single rectifier junction, a plurality of such junctions may be connected in series. A rectifier of this type is illustrated in Fig. 2. It will be noted that this rectifier comprises a plurality of junctions 19 of the type shown in Fig. 1 in superimposed stacked relation so that the bottom surface of each titanium shell is in pressure contact with a central boss of the contact plate of an adjoining junction, whereby the said junctions are effectively connected in series.

The stacked junctions are surrounded by a tightly fitting tube 20 of a suitable insulating material, such as Tenite. After assembly, the end portions of this insulating tube 20 are crimped down by means of a heated die, as shown at 21, whereby the stack will be permanently maintained under pressure and in series connection. A plurality of small apertures 22 may be provided in tube 20 in order to promote the circulation of air through the stack and thereby cool the rectifier junctions. Electrical connection to the stack may be made by applying contact springs against terminal boss 23 of the uppermost rectifier junction and to the exposed portion 24 of the bottom surface of the lowermost rectifier junction, as those skilled in the art will readily understand.

Although the present invention has been disclosed in connection with a few preferred embodiments thereof, variations and modifications may be resorted to by those skilled in the art without departing from the principles of the present invention. I consider all of these variations and modifications to be within the true spirit and scope of the present invention, as disclosed in the foregoing description and defined by the appended claims.

I claim:

1. An asymmetrically conductive junction comprising a titanium plate having an anodized surface, and a layer of compressed electrolytically produced lead peroxide particles in contact therewith.

2. An asymmetrically conductive junction comprising a plate of titanium having an electrolytically formed oxide layer thereon, and a coherent layer of compressed electrolytically produced lead peroxide particles on said oxide layer.

3. An asymmetrically conductive junction comprising a plate of titanium having an electrolytically formed oxide layer of micron thickness thereon, and a dense and continuous coherent layer of electrolytically produced lead peroxide particles compressed on said oxide layer, said lead peroxide layer having a thickness between 0.010" and 0.030".

4. An asymmetrically conductive junction comprising a plate of titanium having an electrolytically formed oxide layer thereon, and a layer of lead peroxide in contact with said oxide layer, said peroxide layer having such characteristics including high electrical conductivity as are obtained by compression of electrolytically produced lead peroxide particles.

5. An asymmetrically conductive junction comprising a plate of titanium having an electrolytically formed oxide layer thereon, a coherent conductive layer of compressed electrolytically produced lead peroxide particles on said oxide layer, and a metal layer in contact with said peroxide layer and constituting one of the terminals of the junction.

6. A rectifier comprising a titanium shell having an anodized inner surface, electrolytically produced lead peroxide particles compressed in said shell to constitute a coherent conductive layer having one of its faces in contact with said anodized inner surface, and a metal terminal in contact with the other face of said lead peroxide layer.

7. A rectifier comprising a shell of titanium having at least its inner surface electrolytically oxidized, a coherent conductive layer of compressed electrolytically produced lead peroxide particles on said surface, and a metal plate in pressure contact with the exposed face of said lead peroxide layer and constituting one of the terminals of the rectifier.

8. A rectifier comprising a shell of titanium having side and bottom walls with an electrolytically oxidized inner surface, a coherent conductive layer of electrolytically produced lead peroxide particles compressed on the bottom wall of said shell, a metal plate on said layer, and an insulating member interposed between cooperating marginal portions of said shell and said plate to maintain said plate in pressure contact with said layer, said shell and said plate respectively constituting the terminals of the rectifier.

9. A rectifier comprising a shell of titanium having side and bottom walls with an electrolytically oxidized inner surface and having the marginal portion at its open end crimped down, a coherent conductive layer of electrolytically produced lead peroxide particles compressed on the bottom wall of said shell, a metal plate on said layer, and an insulating sealing grommet compressed between said crimped down marginal portion of said shell and a circumferential marginal portion of said plate to maintain said plate in pressure contact with said lead peroxide layer and to define with said shell and said plate a sealed enclosure for the rectifier.

10. A rectifier comprising a shell of titanium having side and bottom walls with an electrolytically oxidized inner surface and having the marginal portion at its open end crimped down, a coherent conductive layer of electrolytically produced lead peroxide particles compressed on the bottom wall of said shell, a metal plate in pressure contact with said layer and having a central boss, and an elastic insulating grommet confined between said crimped down marginal portion of said shell and a circumferential marginal portion of said plate to define with said shell and said plate a sealed enclosure for the rectifier, said shell and the central boss of said plate respectively constituting the terminals of the rectifier.

11. A rectifier comprising a plurality of sealed rectifier junctions arranged in superimposed stacked relation; each of said junctions comprising a shell of anodized titanium having side and bottom walls, a coherent conductive layer of compressed electrolytically produced lead peroxide particles on the bottom wall of said shell, and a metal terminal plate in contact with the exposed face of said lead peroxide layer; and means including a tube of insulating material encircling said stacked junctions and having its respective ends constricted over the first and last junction to maintain the shell of each junction in pressure contact with the terminal plate of an adjoining junction thereby to establish effective series connection of the junctions.

12. The method of making alternating current rectifiers which comprises electrodepositing lead peroxide from a lead salt solution on an anode, removing the deposit from said anode, comminuting the removed deposit to obtain lead peroxide particles, and compressing said particles on a base of anodized titanium to provide therewith a rectifier junction.

13. The method of making alternating current rectifiers which comprises electrodepositing a layer of lead peroxide from a lead salt solution on an anode of electrolytically oxidized titanium, removing said layer from said anode and comminuting the same to obtain lead peroxide particles, and compressing said particles on a base of electrolytically oxidized titanium to form therewith a rectifier junction.

14. The method of making alternating current rectifiers which comprises electrodepositing a layer of lead peroxide from a lead salt solution on an anode constituted by a flexible electrically oxidized plate of titanium, flexing said plate to cause separation of said layer therefrom, comminuting said separated layer to obtain electrolytically produced lead peroxide particles, and compressing said particles on a base of electrolytically oxidized titanium to form thereon a dense, coherent and highly conductive layer of lead peroxide and to constitute therewith a rectifier junction.

15. The method of making alternating current rectifiers which comprises electrolytically oxidizing a titanium plate, and compressing on said plate a body of electrolytically produced lead peroxide particles to form therewith a rectifier junction.

References Cited in the file of this patent

FOREIGN PATENTS 683,817  Great Britain _____ Dec. 3, 1952